US012325230B2

(12) United States Patent
Tsuji et al.

(10) Patent No.: US 12,325,230 B2
(45) Date of Patent: Jun. 10, 2025

(54) PRINTING APPARATUS

(71) Applicant: BROTHER KOGYO KABUSHIKI KAISHA, Nagoya (JP)

(72) Inventors: Takuya Tsuji, Chiryu (JP); Yasuo Nishikawa, Nagoya (JP); Hiroaki Takahashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 140 days.

(21) Appl. No.: 18/325,082

(22) Filed: May 29, 2023

(65) Prior Publication Data

US 2023/0294425 A1 Sep. 21, 2023

Related U.S. Application Data

(63) Continuation of application No. PCT/JP2021/042566, filed on Nov. 19, 2021.

(30) Foreign Application Priority Data

Nov. 30, 2020 (JP) ................................ 2020-198997

(51) Int. Cl.
*B41J 11/66* (2006.01)
*B41J 11/70* (2006.01)

(52) U.S. Cl.
CPC ............ *B41J 11/663* (2013.01); *B41J 11/706* (2013.01)

(58) Field of Classification Search
CPC .......... B41J 11/663; B41J 11/70; B41J 11/706
See application file for complete search history.

(56) References Cited

U.S. PATENT DOCUMENTS 6,048,055 A 4/2000 Hakkaku
6,229,983 B1 * 5/2001 Sawada ................ B41J 11/0045 399/385

(Continued)

FOREIGN PATENT DOCUMENTS

JP H11-78140 A 3/1999
JP H1178048 A 3/1999

(Continued)

OTHER PUBLICATIONS

Tanaka, MachineTranslationofWO-2020013165-A1, 2020 (Year: 2020).*

(Continued)

*Primary Examiner* — Scott A Richmond
(74) *Attorney, Agent, or Firm* — KENEALY VAIDYA LLP

(57) ABSTRACT

A printing apparatus includes: a liquid storage part; a conveying unit; an image recording unit including a platen; a cutting unit; and a controller, wherein the controller cuts a recording medium by moving the cutting unit to an outer side of the platen in a scanning direction intersecting a conveying direction of the recording medium, wherein, on the outer side of the platen in the scanning direction, a standby position for the cutting unit to stand by is arranged adjacent to the liquid storage part in a front-rear direction of the printing apparatus, and wherein at least a part of the cutting unit at the standby position is disposed such that a position thereof in a width direction of the printing apparatus overlaps the liquid storage part in a plan view of the printing apparatus as viewed from front.

9 Claims, 10 Drawing Sheets

(56) References Cited

U.S. PATENT DOCUMENTS

| | | | | |
|---|---|---|---|---|
| 6,260,457 | B1 | 7/2001 | Hakkaku | |
| 2006/0007292 | A1 | 1/2006 | Ohmori et al. | |
| 2010/0054836 | A1 | 3/2010 | Beardsley | |
| 2013/0195536 | A1 * | 8/2013 | Yoshinuma | B26D 1/185 83/563 |
| 2016/0297212 | A1 * | 10/2016 | Saiga | B26D 1/045 |
| 2017/0165984 | A1 | 6/2017 | Sato | |
| 2020/0207102 | A1 * | 7/2020 | Fukasawa | B41J 2/175 |
| 2020/0290380 | A1 | 9/2020 | Miyagawa et al. | |
| 2020/0307273 | A1 | 10/2020 | Kuronuma et al. | |
| 2021/0122174 | A1 | 4/2021 | Tanaka et al. | |
| 2022/0184979 | A1 * | 6/2022 | Fukasawa | B41J 11/70 |

FOREIGN PATENT DOCUMENTS

| | | | | | |
|---|---|---|---|---|---|
| JP | 2006035510 | A | | 2/2006 | |
| JP | 2013086235 | A | | 5/2013 | |
| JP | 2013184329 | A | | 9/2013 | |
| JP | 2016-198988 | A | | 12/2016 | |
| JP | 2017-109307 | A | | 6/2017 | |
| JP | 2020-11393 | A | | 1/2020 | |
| JP | 2020001114 | A | * | 1/2020 | |
| JP | 2020146921 | A | | 9/2020 | |
| JP | 2020-157627 | A | | 10/2020 | |
| JP | 2020-163728 | A | | 10/2020 | |
| WO | WO-2020013165 | A1 | * | 1/2020 | B41J 11/70 |

OTHER PUBLICATIONS

Anayama, Machine TranslationofJP-2020001114-A, 2020 (Year: 2020).*

International Preliminary Report on Patentability for PCT/JP2021/042566 dated May 30, 2023.

International Search Report for PCT/JP2021/042566 dated Feb. 1, 2022.

Japanese Office Action for the related Japanese Patent Application No. 2020-198997 dated Aug. 6, 2024.

Japanese Office Action for the related Japanese Patent Application No. 2020-198997 dated Dec. 24, 2024.

* cited by examiner

PRINTING APPARATUS

REFERENCE TO RELATED APPLICATIONS

This is a continuation application of International Application No. PCT/JP2021/042566 filed on Nov. 19, 2021, which claims priority from Japanese Patent Application No. 2020-198997 filed on Nov. 30, 2020. The entire contents of the aforementioned applications are incorporated herein by reference.

BACKGROUND ART

There is a related-art printing apparatus including a cutting unit for cutting a printing medium. For example, a printing apparatus includes a printing unit that performs printing on a large-sized roll paper and a cutting unit that cuts the roll paper. This type of related-art printing apparatus has a configuration in which the printing unit is provided on an upper portion of a pillar erected on a base, and is a large-sized printing apparatus which is disposed and used on a floor.

DESCRIPTION

However, in a printing apparatus that is designed to be used on a table, there is a problem in that a size of such printing apparatus cannot be increased in size as the related-art printing apparatus for mounting a cutter unit.

The present disclosure has been made to solve the above-described problem, and an object of the present disclosure is to provide a printing apparatus having a size reduced to minimum by adjusting an arrangement of a standby position of a cutting unit.

In order to solve the above problem, a printing apparatus according to an aspect of the present disclosure includes: a liquid storage part configured to store a liquid; a conveying unit configured to convey a recording medium along a conveying direction; an image recording unit configured to support the recording medium conveyed by the conveying unit by a platen thereof and record an image on the recording medium; a cutting unit configured to cut the recording medium; and a controller. The controller cuts the recording medium by moving the cutting unit to an outer side of the platen in a scanning direction intersecting the conveying direction. On the outer side of the platen in the scanning direction, a standby position for the cutting unit to stand by is arranged adjacent to the liquid storage part in a front-rear direction of the printing apparatus. At least a part of the cutting unit at the standby position is disposed such that a position thereof in a width direction of the printing apparatus overlaps the liquid storage part in a plan view of the printing apparatus as viewed from front.

In the printing apparatus having the configuration described above, the standby position for the cutting unit to stand by and the liquid storage part are arranged adjacently in the front-rear direction of the printing apparatus. Further, a part of the cutting unit at the standby position is disposed such that a position thereof in the width direction of the printing apparatus overlaps the liquid storage part in a plan view of the printing apparatus as viewed from front. In this way, by adjusting the arrangement of the standby position of the cutting unit, the printing apparatus can be reduced in size.

Hereinafter, a printing apparatus 1 according to an embodiment of the present disclosure will be described with reference to FIGS. 1 to 10.

{Configuration of Printing Apparatus}

Figure 1:
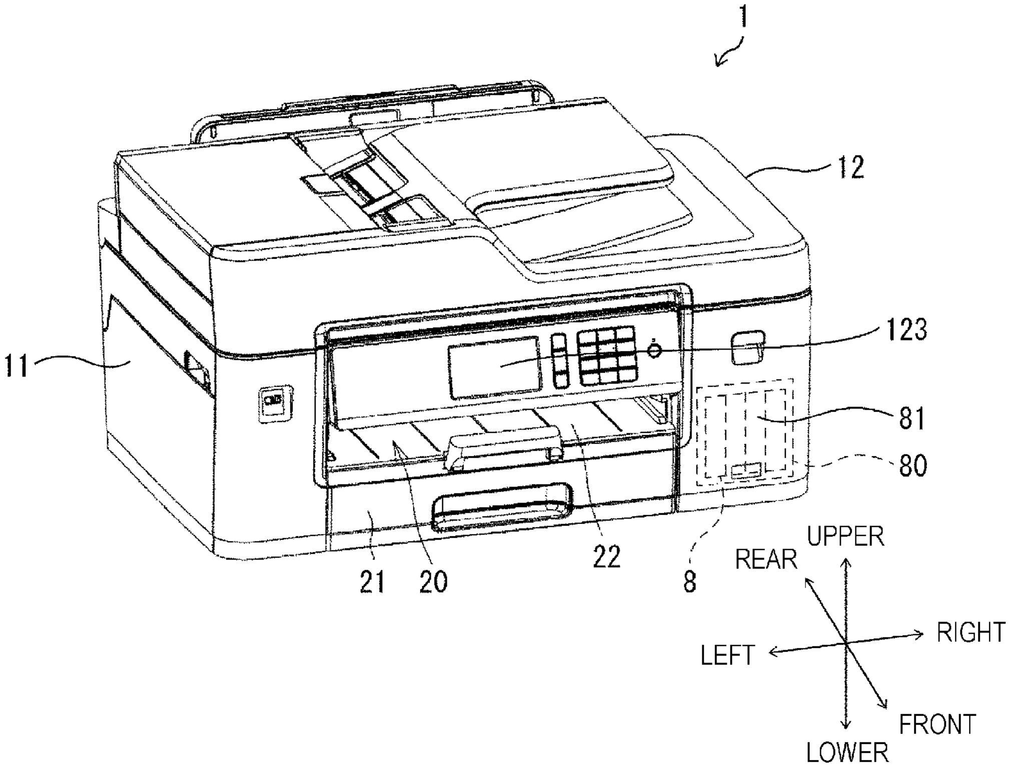
FIG. 1 is a perspective view showing an appearance of a printing apparatus according to an embodiment of the present disclosure.

FIG. 1 is a perspective view showing an appearance of the printing apparatus 1 according to the present embodiment. The printing apparatus 1 shown in FIG. 1 is a multi-function peripheral (MFP) including a printer unit 11 and an image scanning unit 12. The printer unit 11 has an ink jet printing function of recording print data specified by a print job on a sheet P, which is an example of a recording medium, by ejecting ink which is an example of a liquid. The image scanning unit 12 is pivotally provided above an image recording unit 3 in the printing apparatus 1, and has a scanner function of reading an image recorded on the sheet P.

A printing method is not limited to the ink jet method, and may be an electrophotographic method. The printing apparatus 1 may be capable of performing color printing or may be dedicated to monochrome printing. Hereinafter, for convenience of description, an upper-lower direction, a left-right direction, and a front-rear direction of the printing apparatus 1 are defined with reference to a posture at which the printing apparatus 1 is installed on a horizontal plane so as to be usable, as indicated by arrows in FIG. 1. Specifically, it is assumed that a front of the printing apparatus 1 is a discharge direction of the sheet P and a rear of the printing apparatus 1 is an opposite direction of the discharge direction of the sheet P. Further, the front of the printing apparatus 1 may be a direction in which a configuration unit 123 for a user to make various settings is disposed, and may be a direction in which a display device such as a liquid crystal panel for notifying the user of various types of information related to printing is disposed.

An opening 20 is formed in a front surface of the printing apparatus 1, as shown in FIG. 1. A feeding tray 21 and a discharge tray 22 are disposed in the opening 20 movably in the front-rear direction. The feeding tray 21 is a case for accommodating a plurality of sheets P, and has an open upper surface. The discharge tray 22 is disposed above the feeding tray 21, and supports the sheet P, a first sheet P1, and a second sheet P2 on each of which an image is recorded. A size of the sheet P is, for example, an A4 size. The sheet P is not limited to a paper medium, and may be a resin medium such as an OHP sheet.

As shown in FIG. 1, the configuration unit 123 including a display screen is provided on the front surface of the printing apparatus 1. The configuration unit 123 includes, for example, a touch panel, and is configured to enable various settings related to printing performed by the printing apparatus 1, replacement of a cutting unit 10, and the like, by a touch operation of the user. When settings related to the size of the sheet P and whether to execute cutting processing, replacement of the cutting unit 10, and the like are set by the configuration unit 123, the set information is output to a controller 100 (see FIG. 8).

Figure 4:
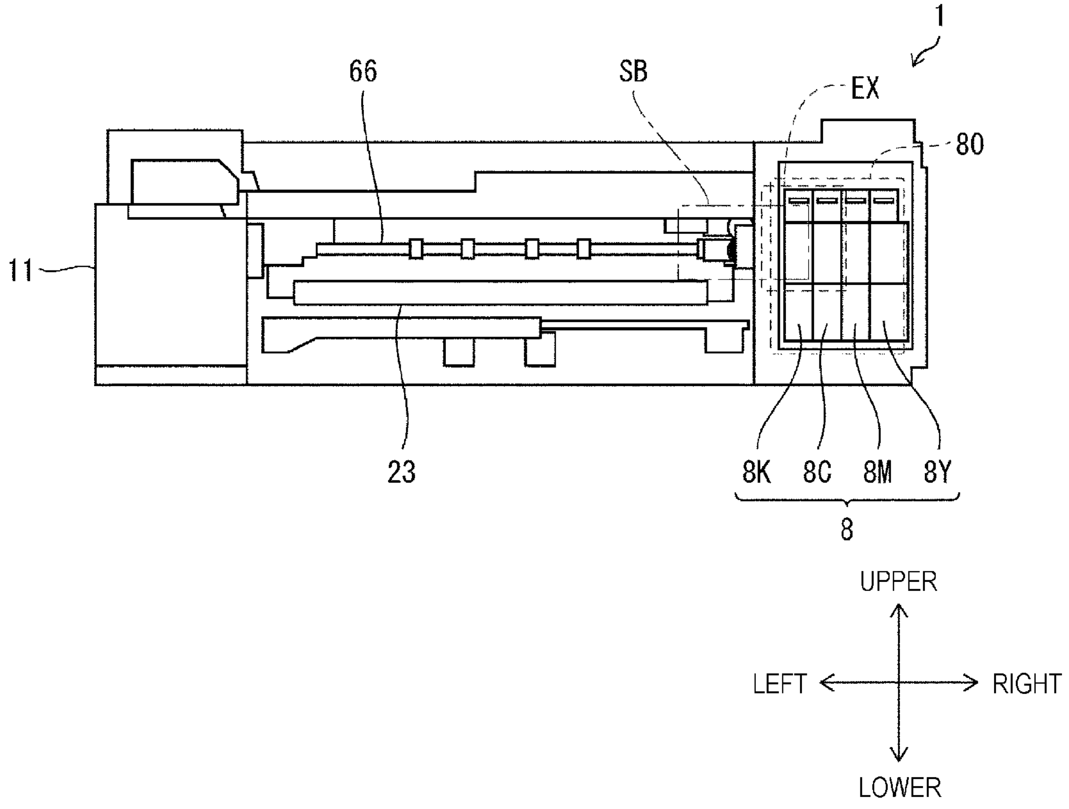
FIG. 4 is a front view showing a standby position of a cutting unit and a position of a cartridge case of the printing apparatus according to the embodiment.

A cartridge cover 81 is pivotally provided on a right side of the front surface of the printing apparatus 1, as shown in FIG. 1. Inside the cartridge cover 81, as shown in FIG. 4, ink cartridges 8 mounted in a cartridge case 80 are disposed. The ink cartridge 8 is an example of a liquid storage part.

Figure 2:
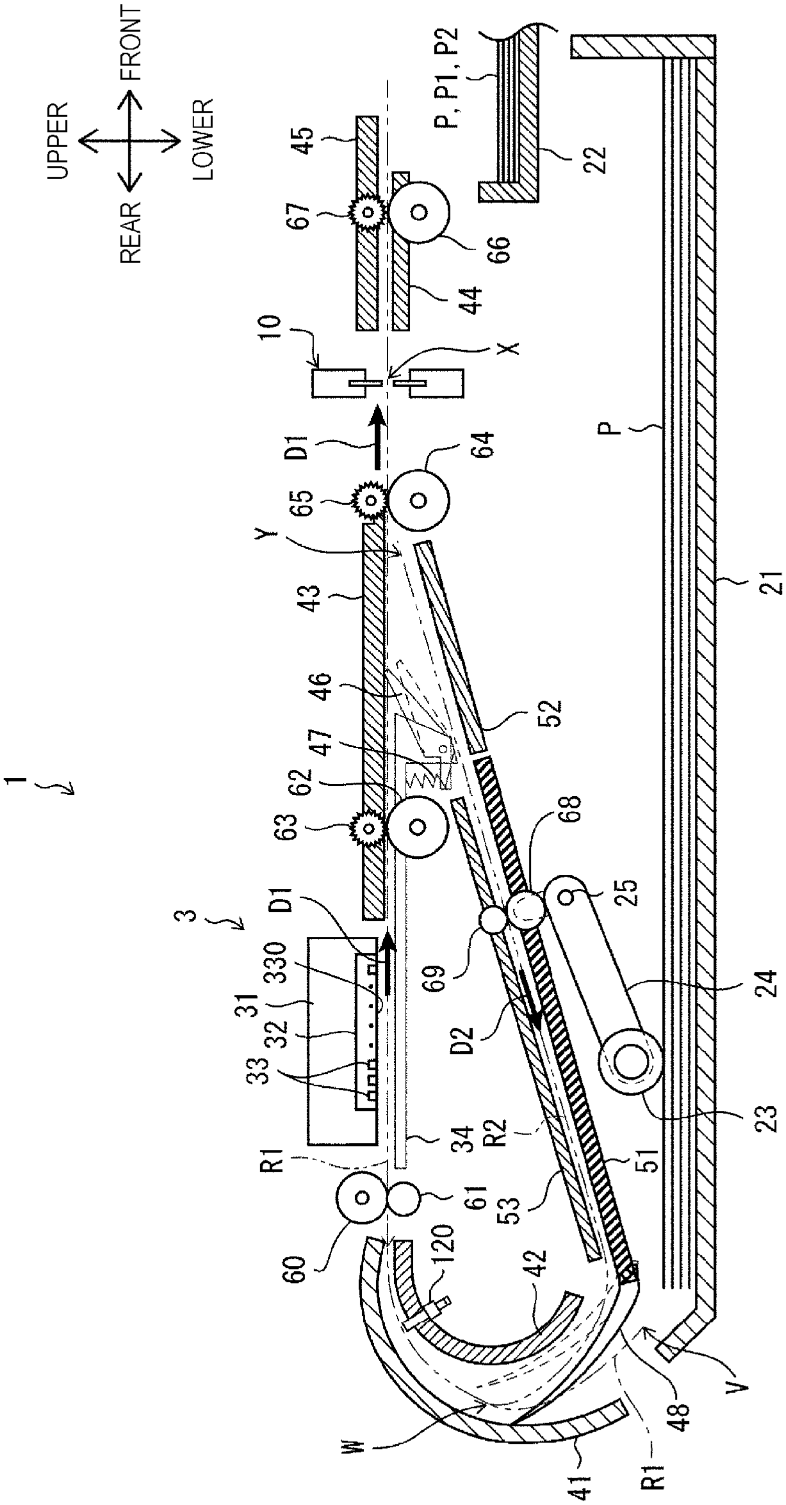
FIG. 2 is a cross-sectional view showing an internal structure of the printing apparatus according to the embodiment.

FIG. 2 is a cross-sectional view showing an internal structure of the printing apparatus 1 according to the present embodiment. As shown in FIG. 2, a feed roller 23, a first conveying path R1, conveyance rollers 60, 62, 64, 66, and 68, the image recording unit 3, the cutting unit 10, and a second conveying path R2 are disposed inside the printing apparatus 1. The feed roller 23 and the conveyance rollers 60, 62, 64, and 66 are an example of a conveying unit that conveys the sheet P in a first conveying direction D1 (conveying direction).

The feed roller 23 is a roller for feeding the sheet P accommodated in the feeding tray 21 to the first conveying path R1. The feed roller 23 is rotatably supported at a front end portion of a feeding arm 24. The feeding arm 24 is pivotally supported by a shaft 25 supported by a frame of the printing apparatus 1. The feeding arm 24 is pivotally biased toward the feeding tray 21 by an own weight or an elastic force of a spring or the like.

Figure 8:
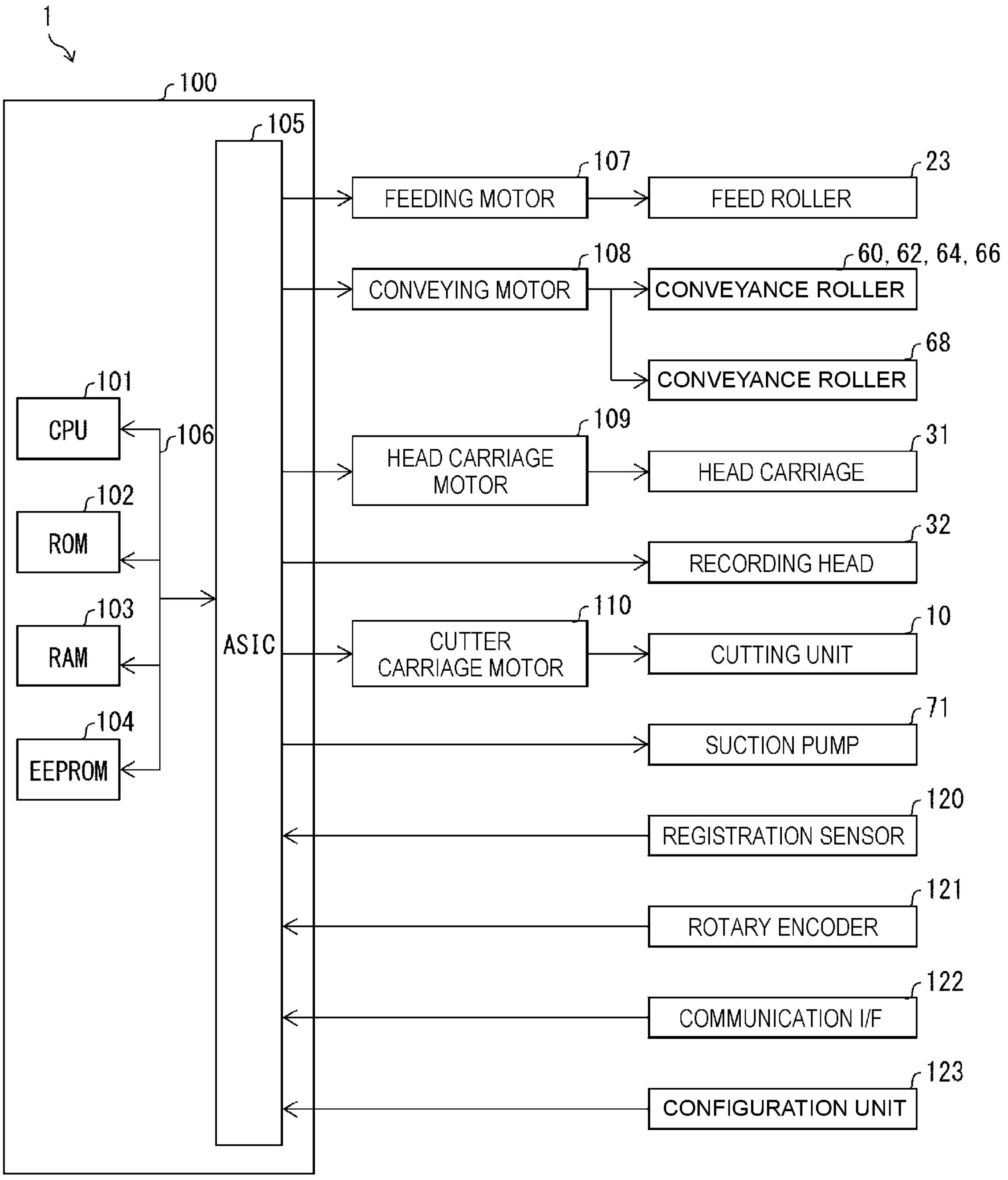
FIG. 8 is a block diagram showing an electrical configuration of the printing apparatus according to the embodiment.

The feed roller 23 is rotated forward by being driven by a feeding motor 107 (see FIG. 8). When the feed roller 23 rotates forward, the sheets P accommodated in the feeding tray 21 are fed one by one to the first conveying path R1. The sheet P fed to the first conveying path R1 is conveyed in the first conveying direction D1, that is, in a direction from the rear to the front of the printing apparatus 1.

The first conveying path R1 refers to a space formed by guide members 41, 42, 43, and 44, the image recording unit 3, and the like. The first conveying path R1 extends upward from a rear end portion of the feeding tray 21, is curved in a region defined by the guide members 41 and 42, passes through a position of the image recording unit 3, extends linearly in a region defined by the guide members 43 and 44, and reaches the discharge tray 22.

The conveyance roller 60 is disposed upstream of the image recording unit 3 in the first conveying direction D1 in the first conveying path R1. A pinch roller 61 is disposed at a position facing a lower portion of the conveyance roller 60. The conveyance roller 60 is driven by a conveying motor 108 (see FIG. 8). The pinch roller 61 rotates as the conveyance roller 60 rotates. When the conveyance roller 60 and the pinch roller 61 rotate forward, the sheet P is nipped by the conveyance roller 60 and the pinch roller 61 and conveyed up to the image recording unit 3.

As shown in FIG. 2, the conveyance roller 62 is disposed downstream of the image recording unit 3 in the first conveying direction D1 in the first conveying path R1. A spur roller 63 is disposed at a position facing an upper portion of the conveyance roller 62. The conveyance roller 62 is driven by the conveying motor 108. The spur roller 63 rotates as the conveyance roller 62 rotates. When the conveyance roller 62 and the spur roller 63 rotate forward, the sheet P is nipped by the conveyance roller 62 and the spur roller 63 and conveyed downstream in the first conveying direction D1.

Further, the conveyance roller 64 is disposed downstream of the conveyance roller 62 in the first conveying direction D1 in the first conveying path R1. A spur roller 65 is disposed at a position facing an upper portion of the conveyance roller 64. The conveyance roller 64 is driven by the conveying motor 108. The spur roller 65 rotates as the conveyance roller 64 rotates. When the conveyance roller 64 and the spur roller 65 rotate forward, the sheet P is nipped by the conveyance roller 64 and the spur roller 65 and conveyed toward a cutting unit 10 side. On the other hand, when the conveyance roller 64 and the spur roller 65 rotate in a reverse direction, the sheet P is nipped by the conveyance roller 64 and the spur roller 65 and conveyed toward the second conveying path R2 along a lower surface of a first flap 46.

The first flap 46 is provided between the conveyance roller 62 and the conveyance roller 64 in the first conveying path R1. The first flap 46 is disposed at a position near a branching position Y facing the guide member 43. The first flap 46 is supported by a platen 34 pivotally between a first state and a second state. In the first state indicated by a solid line in FIG. 2, the first flap 46 is abutted with the guide member 43 to close the first conveying path R1. On the other hand, in the second state indicated by a dotted line in FIG. 2, the first flap 46 is located at a position lower than that in the first state and is separated from the guide member 43, which causes the sheet P conveyed in the first conveying direction D1 to pass.

Further, the first flap 46 is urged upward by a coil spring 47. One end of the coil spring 47 is connected to the first flap 46, and the other end of the coil spring 47 is connected to the platen 34. The first flap 46 is brought into the first state by being urged by the coil spring 47, and a front end thereof is abutted with the guide member 43.

The conveyance roller 66 is disposed downstream of the cutting unit 10 in the first conveying direction D1 in the first conveying path R1. A spur roller 67 is disposed at a position facing an upper portion of the conveyance roller 66. The conveyance roller 66 is driven by the conveying motor 108. The spur roller 67 rotates as the conveyance roller 66 rotates. When the conveyance roller 66 and the spur roller 67 rotate forward, the sheet P, the first sheet P1, and the second sheet P2 are conveyed by the conveyance roller 66 and discharged to the discharge tray 22.

Figure 6:
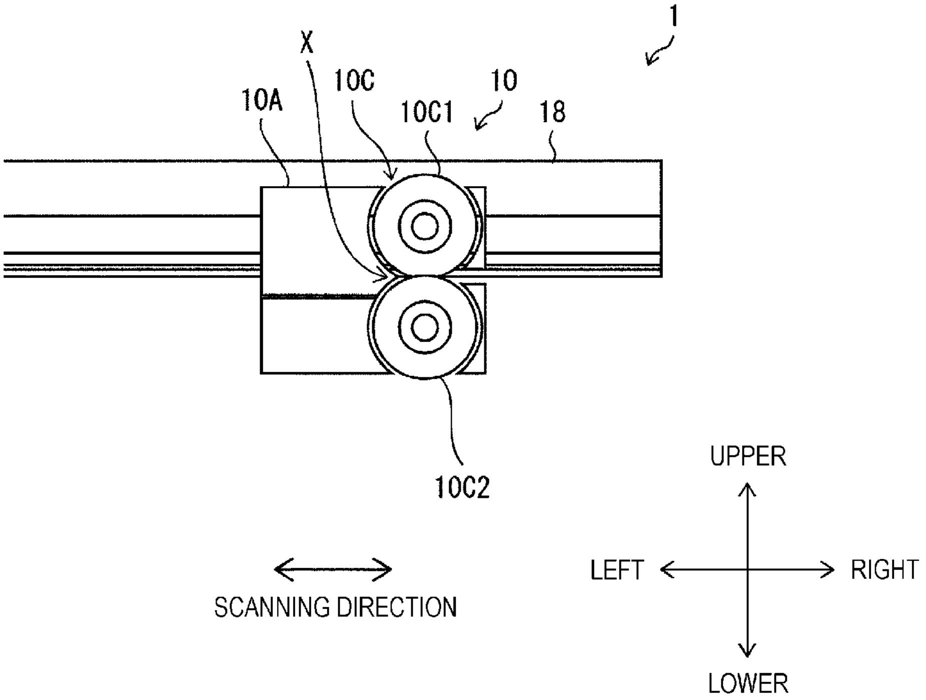
FIG. 6 is a view showing an appearance of the cutting unit of the printing apparatus according to the embodiment.

In the first conveying path R1, the cutting unit 10 is disposed between the conveyance roller 64 and the conveyance roller 66. As shown in FIG. 6, the cutting unit 10 includes a cutter unit 10C, and cuts the sheet P by moving a cutter carriage 10A in a scanning direction by a driving force of a cutter carriage motor 110 (see FIG. 8).

As shown in FIG. 2, a second flap 48 is pivotally disposed at a merging position W of the first conveying path R1 and the second conveying path R2. Specifically, the second flap 48 is provided pivotally between a first state indicated by a solid line in FIG. 2 and a second state indicated by a dotted line in FIG. 2. When the second flap 48 is in the first state, a part of the second conveying path R2 is formed by the second flap 48 and the guide member 42. Further, when the second flap 48 is in the second state, a part of the first conveying path R1 is formed by the second flap 48 and the guide member 41.

A registration sensor 120 is disposed upstream of the conveyance roller 60 in the first conveying path R1. The registration sensor 120 is attached to the guide member 42 and is a sensor that detects a fact that a leading end or a trailing end of the sheet P passes through an abutting position of being abutted with the conveyance roller 60. As the registration sensor 120, a sensor having an actuator that swings when the sheet P is abutted with the conveyance roller 60, an optical sensor, or the like can be used. The registration sensor 120 outputs an ON signal when the sheet P is passing through the abutting position with the conveyance roller 60, and outputs an OFF signal when the sheet P is not passing through the abutting position with the conveyance roller 60. A detection signal from the registration sensor 120 is output to the controller 100.

The conveyance roller 60 is provided with a rotary encoder 121 for detecting rotation of the conveyance roller 60. The rotary encoder 121 outputs a pulse signal to the controller 100 in response to the rotation of the conveyance roller 60 (see FIG. 8). The rotary encoder 121 includes an encoder disk and an optical sensor. The encoder disk rotates together with the conveyance roller 60. The optical sensor reads the rotating encoder disk to generate a pulse signal, and outputs the generated pulse signal to the controller 100.

The second conveying path R2 is defined by the guide members 51, 52, and 53, the conveyance roller 68, a pinch roller 69, and the like. The second conveying path R2 branches from the branching position Y upstream of the conveyance roller 64 in the first conveying path R1, and is connected to the merging position W upstream of the image recording unit 3 in the first conveying path R1 in the first conveying direction D1. Thus, printing can be performed on both sides of the sheet P by the image recording unit 3.

{Configuration of Image Recording Unit}

Figure 3:
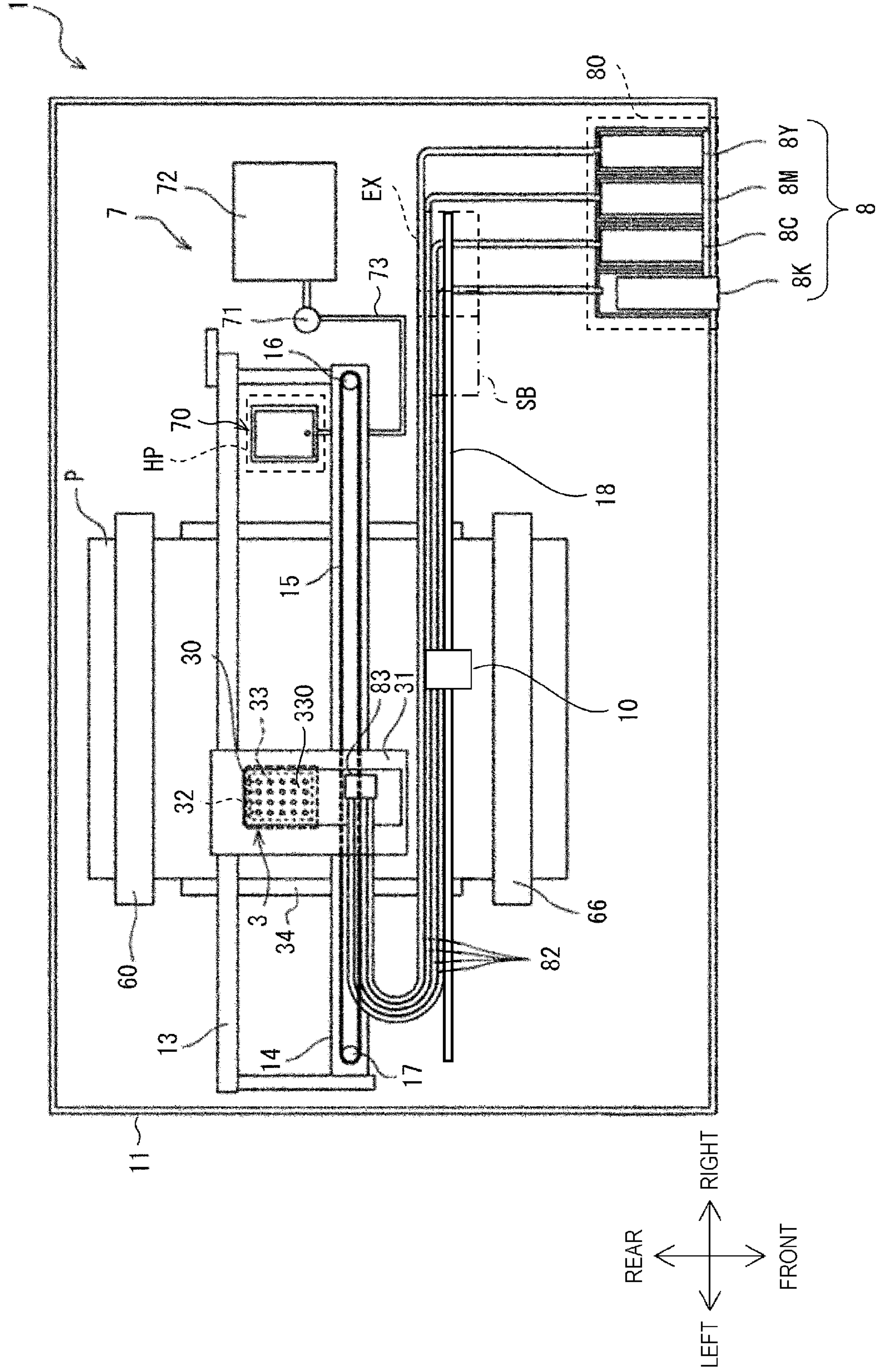
FIG. 3 is a view of a periphery of an image recording unit of the printing apparatus according to the embodiment as viewed from above.

FIG. 3 is a view of a periphery of the image recording unit 3 of the printing apparatus 1 according to the present embodiment as viewed from above. As shown in FIG. 3, the image recording unit 3 includes a buffer tank 30, a head carriage 31, a recording head 32, a plurality of nozzles 33, and the platen 34, and is a unit for recording an image on the sheet P.

The buffer tank 30 stores ink L supplied from the ink cartridges 8 through supply tubes 82. The buffer tank 30 is integrally provided with a tube joint 83. One ends of four supply tubes 82 are detachably connected to the tube joint 83. The other ends of the four supply tubes 82 are respectively connected to four ink cartridges 8Y, 8M, 8C, and 8K.

As shown in FIG. 2, the image recording unit 3 is disposed between the conveyance roller 60 and the conveyance roller 62 in the first conveying path R1. The recording head 32 is mounted on the head carriage 31. A lower surface of the recording head 32 is a nozzle surface 330 in which the plurality of nozzles 33 are formed.

The plurality of nozzles 33 communicate with an inside of the buffer tank 30. The recording head 32 ejects the ink L stored in the buffer tank 30 from the nozzles 33 toward the sheet P by vibrating a vibrating element such as a piezo element. The nozzles 33 eject the ink L of three colors including yellow, cyan, and magenta, and the ink L of black color.

The platen 34 is a rectangular plate-shaped member on which the sheet P is placed. In a process in which the head carriage 31 moves with respect to the sheet P supported by the platen 34, the recording head 32 selectively ejects ink droplets, thereby recording an image on the sheet P.

As shown in FIG. 3, two guide rails 13 and 14 extending in parallel in the scanning direction (the left-right direction in FIG. 3) are provided above the platen 34. The head carriage 31 is attached to the two guide rails 13 and 14. The head carriage 31 is configured to move in the left-right direction along the two guide rails 13 and 14 in an area facing the platen 34.

Further, a driving belt 15 is attached to the head carriage 31. The driving belt 15 is an endless belt wound around two pulleys 16 and 17. The pulley 16 is connected to a head carriage motor 109 (see FIG. 8). Forward or reverse rotation of the head carriage motor 109 drives the pulley 16 to rotate, and the driving belt 15 runs. Therefore, the head carriage 31 reciprocates in the left-right direction. At this time, the head carriage 31 mounted on the head carriage 31 also reciprocates in the left-right direction.

The head carriage 31 reciprocates in the scanning direction by transmission of the driving force of the head carriage motor 109 (see FIG. 3). In recording of an image on the sheet P, the controller 100 of the printing apparatus 1 repeats recording processing of recording an image of one line on the sheet P by ejecting the ink from the recording head 32 while moving the head carriage 31 in the scanning direction in a state where the conveying of the sheet P is stopped, and line feed processing of driving the conveyance roller 60 and the conveyance roller 62 to convey the sheet P by a predetermined line feed amount. Thus, a desired image or the like is recorded on the sheet P.

{Configuration of Suction Unit}

A suction unit 7 performs suction purge of the nozzles 33 as a maintenance operation for recovering the discharge states of the nozzles 33. As shown in FIG. 3, the suction unit 7 includes a cap portion 70, a suction pump 71, and a waste liquid tank 72. A configuration of the suction unit 7 shown in FIG. 3 is an example, and is not limited thereto.

The cap portion 70 is disposed on a right side of the platen 34 in the scanning direction. During standby when the image recording unit 3 is not recording an image on the sheet P, the head carriage 31 shown in FIG. 3 moves to a standby position HP where the nozzle surface 330 of the recording head 32 and the cap portion 70 face each other in the upper-lower direction. At the standby position HP, the cap portion 70 is attached to the recording head 32 and covers the nozzle surface 330, thereby sealing the nozzles 33. This prevents the nozzles 33 from drying.

The cap portion 70 is made of, for example, a rubber material. At the standby position HP, the cap portion 70 is configured to move so as to be abutted with and separated from the recording head 32 when driven by a cap displacement unit which is not shown.

At the standby position HP, the cap portion 70 is attached to the recording head 32 to cover the nozzle surface 330, thereby sealing the nozzles 33. This prevents the nozzles 33 from drying. The cap portion 70 is configured to move so as to be abutted with and separated from the recording head 32 when driven by the cap displacement unit which is not shown.

The suction pump 71 is, for example, a tube pump. Driving of the suction pump 71 is controlled by the controller 100. When the suction pump 71 is driven, gas and a liquid in the cap portion 70 are sucked. The suction pump 71 is connected to the waste liquid tank 72 via a tube 73. The waste liquid tank 72 stores the ink L that is discharged from the inside of the cap portion 70 by the suction pump 71.

{Configuration of Ink Cartridge}

FIG. 4 is a front view showing a standby position SB of the cutting unit 10 and a position of the cartridge case 80 in the printing apparatus 1 according to the present embodiment. As shown in FIGS. 3 and 4, the cartridge case 80 in which the ink cartridges 8 are mounted is disposed on a front right side of the standby position SB in the printing apparatus 1.

The ink cartridge 8 is a substantially rectangular parallelepiped container for storing the ink L, and four ink cartridges 8 are provided. The four ink cartridges 8Y, 8M, 8C, and 8K store the ink L of four colors including yellow (Y), magenta (M), cyan (C), and black (K), respectively. The ink L is pigment ink obtained by dispersing pigment particles in a solvent.

As shown in FIG. 3, the four ink cartridges 8Y, 8M, 8C, and 8K are connected to the image recording unit 3 via the four supply tubes 82, respectively. The supply tube 82 is made of a flexible material and establishes communication between an inside of the ink cartridge 8 and an inside of the buffer tank 30 of the image recording unit 3. Although not shown, a flexible flat cable extends from the head carriage 31. The flexible flat cable electrically connects the controller 100 and the recording head 32.

{Opening Portion}

Figure 5:
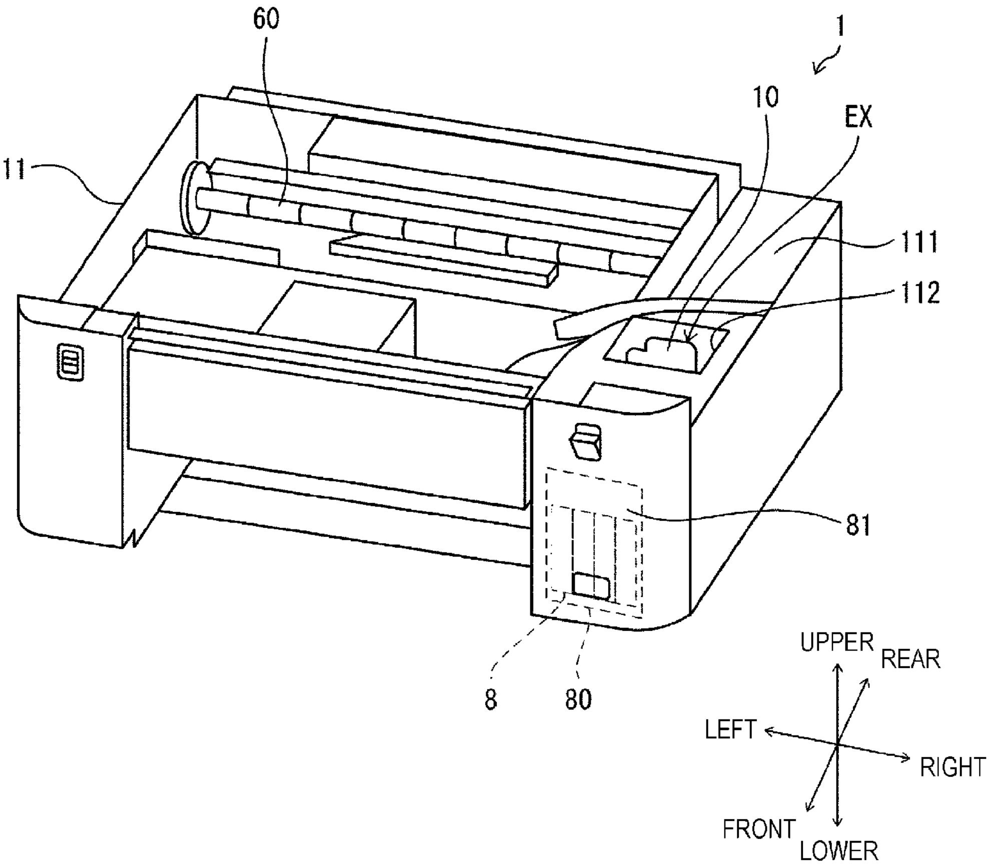
FIG. 5 is a perspective view showing an upper surface of a printer unit in a state where an image scanning unit is opened in the printing apparatus according to the embodiment.

FIG. 5 is a schematic perspective view showing an upper surface of the printer unit 11 when the image scanning unit 12 is opened in the printing apparatus 1 according to the first embodiment. As shown in FIG. 5, a cover member 111 made of resin, for example, is disposed on the upper surface of the printer unit 11. An opening portion 112 is formed in the cover member 111. The opening portion 112 communicates with a replacement position EX and has a size that allows the cutter unit 10C to pass therethrough. The user can replace the cutter unit 10C of the cutting unit 10 shown in FIG. 6 through the opening portion 112.

{Configuration of Cutting Unit}

FIG. 6 is a view showing an appearance of the cutting unit 10 of the printing apparatus 1 according to the present embodiment. As shown in FIG. 6, the cutting unit 10 includes the cutter unit 10C mounted on the cutter carriage 10A. The cutter unit 10C includes a circular upper blade 10C1 and a circular lower blade 10C2. The cutter unit 10C is attached to the cutter carriage 10A by, for example, screws. At the time of replacing the cutting unit 10, the user can detach the cutter unit 10C from the cutter carriage 10A by loosening the screws with a tool or the like.

Figure 7:
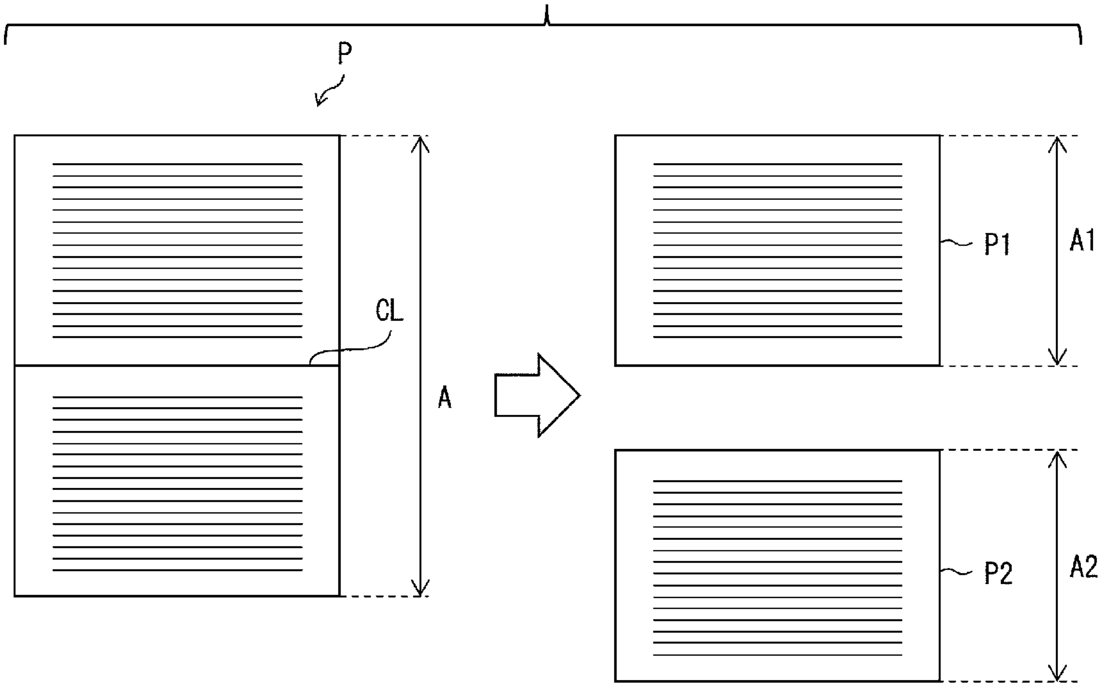
FIG. 7 is a diagram showing a sheet before cutting and a first sheet and a second sheet obtained after cutting.

The upper blade 10C1 is rotatably mounted on the cutter carriage 10A via an O-ring or the like which is not shown. The lower blade 10C2 is also rotatably mounted on the cutter carriage 10A via an O-ring or the like, similar to the upper blade 10C1. The cutting unit 10 cuts the sheet P by abutting the upper blade 10C1 and the lower blade 10C2 with each other while rotating the upper blade 10C1 and the lower blade 10C2 at a cutting position X. The sheet P cut by the cutting unit 10 is divided into the first sheet P1 and the second sheet P2, as shown in FIG. 7.

The upper blade 10C1 and the lower blade 10C2 may be fixed blades or may be a combination including a rotary blade and a fixed blade. Further, the cutter unit 10C may include only one of the upper blade 10C1 and the lower blade 10C2. In this case, the cutting position X refers to a position where the upper blade 10C1 or the lower blade 10C2 is abutted with the sheet P. Further, a shape and a size of the cutter unit 10C can be appropriately changed.

As shown in FIG. 6, the cutting unit 10 is supported movably in the scanning direction by a support rail 18 extending in the scanning direction. The support rail 18 is provided with an endless belt wound around a rotation shaft which is not shown. The endless belt is connected to the cutter carriage 10A. The rotation shaft is rotated by a driving force of the cutter carriage motor 110 (see FIG. 8) to rotate the endless belt, and thus the cutter carriage 10A moves in the scanning direction along the support rail 18.

{Positional Relationship of Ink Cartridge, Standby Position and Replacement Position}

As shown in FIG. 3, the standby position SB for the cutting unit 10 to stand by is provided on an outer right side of the platen 34 in the scanning direction (the left-right direction in FIG. 3). The standby position SB is a space for keeping the cutting unit 10 in a standby state in which the cutting unit 10 does not cut the sheet.

The standby position SB is located behind the cartridge case 80 in which the ink cartridges 8 are mounted. That is, the ink cartridges 8 are disposed adjacent to the standby position SB in the front-rear direction of the printing apparatus 1. Further, as shown in FIG. 1, the cartridge case 80 is disposed adjacent to the discharge tray 22 in a width direction (the left-right direction of FIG. 1) of the printing apparatus 1.

Further, as shown in FIG. 4, a part of the cutting unit 10 moved to the standby position SB overlaps the cartridge case 80 in positions in the width direction and a height direction of the printing apparatus 1, in a plan view of the printing apparatus 1 as viewed from front. That is, a part of the cutting unit 10 at the standby position SB is disposed to overlap the ink cartridges 8 in a plan view of the printing apparatus 1 as viewed from front.

Further, as shown in FIG. 3, the replacement position EX for replacing the cutter unit 10C is provided on an outer right side of the standby position SB in the scanning direction. That is, the standby position SB and the replacement position EX are arranged on the right side in the scanning direction. Further, the standby position SB of the cutting unit 10 is arranged on a rear side of the standby position HP of the cap portion 70.

FIG. 7 is a diagram showing the sheet P before cutting and the first sheet P1 and the second sheet P2 obtained after cutting. In the example shown in FIG. 7, the sheet P having a length of A in the conveying direction is cut by the cutting unit 10, and thus the sheet P is divided into two equal parts including the first sheet P1 having a length of A1 in the conveying direction and the second sheet P2 having a length of A2 in the conveying direction. For example, when the size of the sheet P is A4, the first sheet P1 and the second sheet P2 both having a size of A5 are obtained. In the first conveying path R1, the first sheet P1 is conveyed prior to the second sheet P2.

{Electrical Configuration of Printing Apparatus}

FIG. 8 is a block diagram showing an electrical configuration of the printing apparatus 1 according to the present embodiment. As shown in FIG. 8, the printing apparatus 1 includes the controller 100 and a communication interface (I/F) 122 in addition to the units described above.

The controller 100 includes a central processing unit (CPU) 101, a read only memory (ROM) 102, a random access memory (RAM) 103, an EEPROM 104 (registered trademark), and an ASIC 105, which are connected by an internal bus 106. The ROM 102 stores programs and the like for the CPU 101 to control various operations. The RAM 103 is used as a storage area for temporarily storing data, signals, and the like used when the CPU 101 executes the programs, or as a work area for data processing. The EEPROM 104 stores setting information to be held even after the power is turned off. The controller 100 controls the feeding motor 107, the conveying motor 108, the recording head 32, the suction pump 71, the head carriage motor 109, the cutter carriage motor 110, and the like based on a control program read from the ROM 102.

The feeding motor 107, the conveying motor 108, the head carriage motor 109, the recording head 32, the cutter carriage motor 110, the suction pump 71, the registration sensor 120, the rotary encoder 121, the communication I/F 122, and the configuration unit 123 are connected with the ASIC 105.

The ASIC 105 supplies driving currents to the feeding motor 107, the conveying motor 108, the head carriage motor 109, and the cutter carriage motor 110. The feeding motor 107, the conveying motor 108, the head carriage motor 109, and the cutter carriage motor 110 are DC motors in which a rotation speed increases as the supplied driving current increases, and the rotation speed decreases as the supplied driving current decreases. The controller 100 controls rotation of the feeding motor 107, the conveying motor 108, the head carriage motor 109, and the cutter carriage motor 110 by pulse width modulation (PWM) control, for example.

Further, the controller 100 causes ink droplets to be ejected from the nozzles by applying a driving voltage to the vibrating element of the recording head 32. The controller 100 detects a rotation amount of the conveyance roller 60 based on the pulse signal output from the rotary encoder 121. The controller 100 detects that the sheet P passes the abutting position with the conveyance roller 60, based on a detection signal output from the registration sensor 120. Then, after an ON signal is output from the registration sensor 120, the controller 100 estimates a conveying amount of the sheet P in the first conveying path R1 based on the pulse signal output from the rotary encoder 121.

The communication I/F 122 is connected to a network such as a LAN, and enables connection to an external device in which a driver for the printing apparatus 1 is incorporated. The printing apparatus 1 can receive, via the communication I/F 122, a print job including identification information for identifying a type of the sheet P.

{Flow of Control Performed by Controller During Printing}

Figure 9:
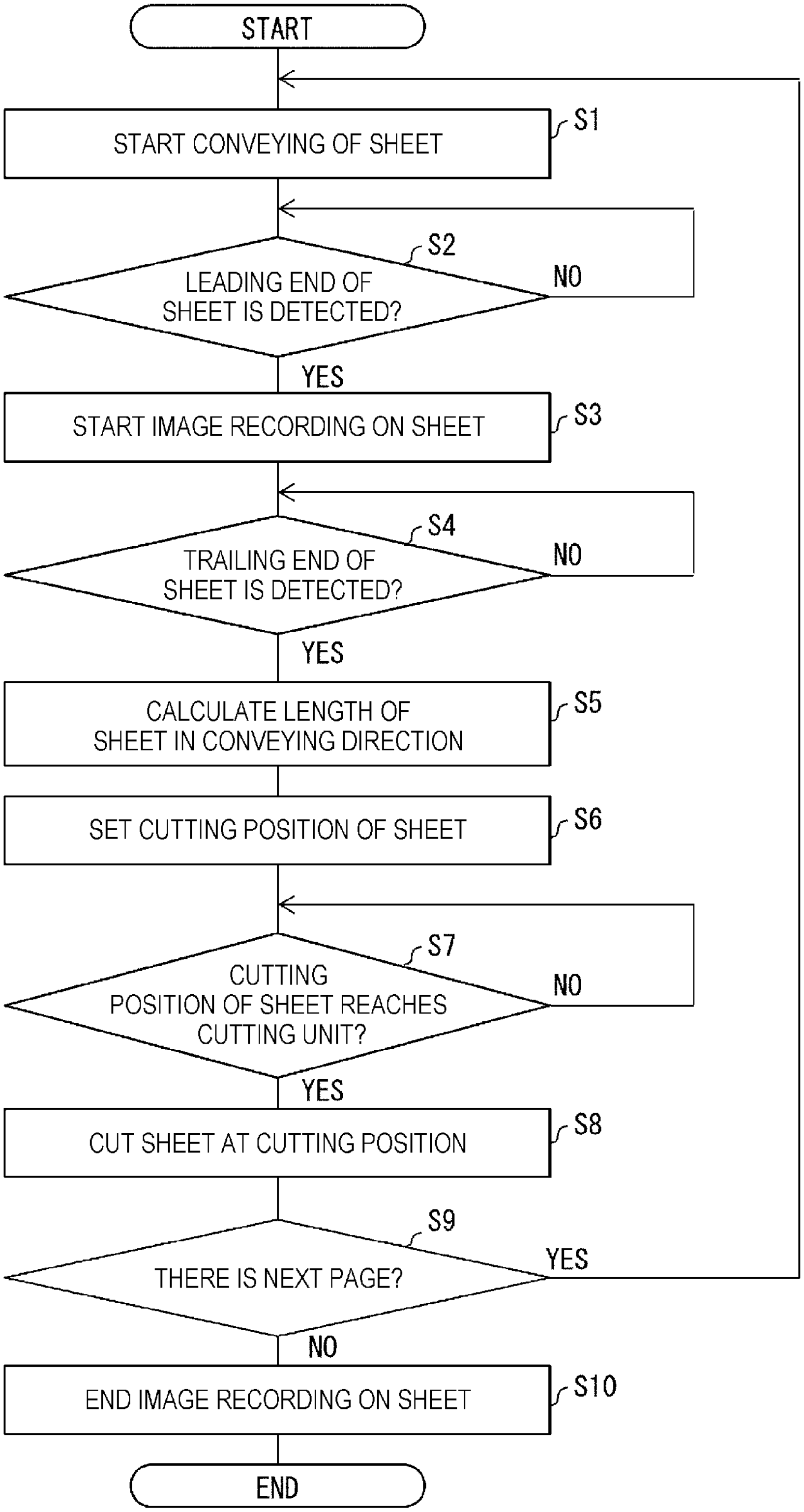
FIG. 9 is a flowchart showing an example of a flow of control during printing of the printing apparatus according to the embodiment.

Next, a flow of control during printing performed by the controller 100 of the printing apparatus 1 according to the present embodiment will be described with reference to a flowchart of FIG. 9. FIG. 9 is a flowchart showing an example of a flow of the control during printing performed by the printing apparatus 1 according to the present embodiment.

In the flowchart shown in FIG. 9, first, when receiving the print job via the communication I/F 122, the controller 100 drives the feeding motor 107 to forward rotate the feed roller 23, thereby taking out the sheet P from the feeding tray 21, and starting conveying of the sheet P (S1). Specifically, after the sheet P is conveyed from the feeding tray 21 to the first conveying path R1, the sheet P is conveyed toward the image recording unit 3.

Next, the controller 100 uses the detection result of the registration sensor 120 to determine whether the leading end of the sheet P is detected (S2). When the leading end of the sheet P is not detected (S2: NO), the controller 100 returns to S2, and when the leading end of the sheet P is detected (S2: YES), the controller 100 controls the image recording unit 3 to start image recording on the sheet P (S3).

In S3, the controller 100 records an image on the sheet P by performing, on the sheet P conveyed to the image recording unit 3, image recording processing in which the line feed processing and the recording processing shown below are alternately repeated. That is, in the line feed processing, the controller 100 conveys the sheet P toward the first conveying direction D1 by a predetermined conveying amount by forward rotating the conveying motor 108 to drive the conveyance rollers 60, 62, and 64.

Further, in the recording processing, the controller 100 records an image of one line by driving the head carriage motor 109 to move the head carriage 31 in a width direction of the sheet P, and ejecting ink droplets from the nozzles 33 of the recording head 32 onto the sheet P during a time when the conveying of the sheet P is stopped.

After S3, the controller 100 determines whether the registration sensor 120 detects a trailing end of the sheet P (S4). When the registration sensor 120 does not detect the trailing end of the sheet P (S4: NO), the controller 100 returns to S4, and when the registration sensor 120 detects the trailing end of the sheet P (S4: YES), the controller 100 calculates the length A of the sheet P in the first conveying direction D1 shown in FIG. 7 (S5).

Specifically, the controller 100 calculates the length A of the sheet P in the first conveying direction D1 based on a conveying amount of the sheet P detected by the rotary encoder 121 from when the registration sensor 120 detects the leading end of the sheet P to when the registration sensor 120 detects the trailing end of the sheet P.

Then, the controller 100 sets a cutting position CL of the sheet P shown in FIG. 7 based on the length A of the sheet P in the first conveying direction D1 calculated in S5 (S6). After S6, the controller 100 determines whether the cutting position CL of the sheet P reaches a position X (see FIG. 2) of the cutting unit 10 based on the detection results of the registration sensor 120 and the rotary encoder 121 (S7).

When the sheet P does not reach the position X of the cutting unit 10 (S7: NO), the controller 100 returns to S7. On the other hand, when the sheet P reaches the position X of the cutting unit 10 (S7: YES), the controller 100 cuts the sheet P at the cutting position CL by moving the cutting unit 10 in the scanning direction in a state where the sheet P is sandwiched between the upper blade 10C1 and the lower blade 10C2 (S8). As a result, as shown in FIG. 7, the first sheet P1 and the second sheet P2, which are half the size of the sheet P, are obtained. The user uses the configuration unit 123 to set whether to cut the sheet P.

After S8, the controller 100 determines whether there is a next page (S9). When there is no next page (S9: NO), the controller 100 discharges the first sheet P1 and the second sheet P2 to the discharge tray 22, and ends the image recording on the sheet P (S10).

On the other hand, when there is a next page (S9: YES), the controller 100 discharges the first sheet P1 and the second sheet P2 to the discharge tray 22 while ending the printing on the second sheet P2 performed by the image recording unit 3, then returns to S1, and thereafter performs the same processing as that of S2 to S9. In this way, the flowchart shown in FIG. 9 ends.

{Flow of Control Performed by Controller During Replacement of Cutting Unit}

Figure 10:
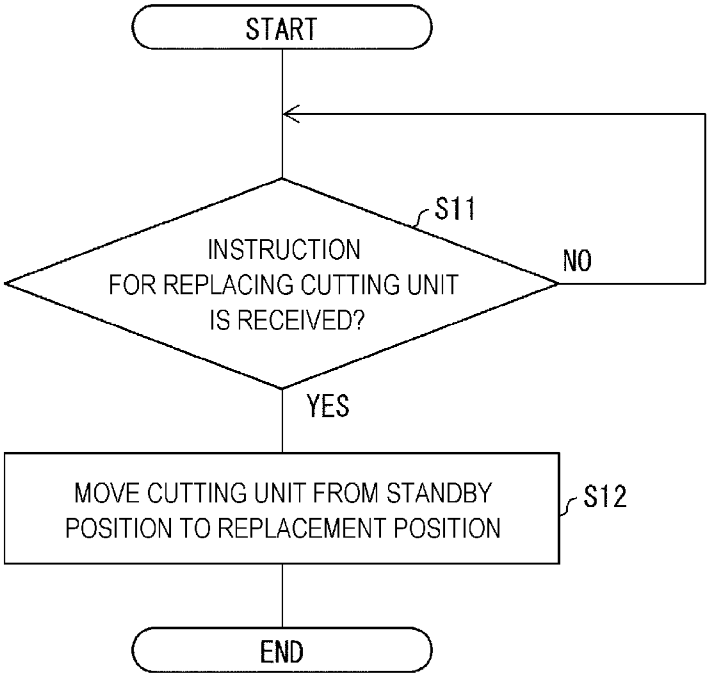
FIG. 10 is a flowchart showing an example of a flow of control during replacement of the cutting unit of the printing apparatus according to the embodiment.

FIG. 10 is a flowchart showing an example of a flow of control during replacement of the cutting unit 10 of the printing apparatus 1 according to the present embodiment. In the flowchart shown in FIG. 10, first, the controller 100 determines whether an instruction for replacing the cutting unit 10 is received (S11).

When the user operates the configuration unit 123 and the printing apparatus 1 receives the instruction for replacing the cutting unit 10 (S11: YES), the controller 100 moves the cutting unit 10 from the standby position SB to the replacement position EX along the scanning direction (S12). On the other hand, when the printing apparatus 1 does not receive the instruction for replacing the cutting unit 10 (S11: NO), the processing returns to S11.

In S12, when moving the cutting unit 10 from the standby position SB to the replacement position EX, the controller 100 moves the cutting unit 10 at a speed lower than a moving speed of the cutting unit 10 when the cutting unit 10 cuts the sheet P in S8. Accordingly, an impact applied to the cutting unit 10 when the cutting unit 10 is moved to the replacement position EX can be reduced.

As described above, after the cutting unit 10 is moved from the standby position SB to the replacement position EX, as shown in FIG. 5, the user can open the image scanning unit 12 and replace the cutter unit 10C with a tool or the like through the opening portion 112 of the cover member 111.

According to the printing apparatus 1 of the present embodiment described above, as shown in FIG. 3, the standby position SB of the cutting unit 10 and the position of the ink cartridges 8 are disposed adjacent to each other in the front-rear direction of the printing apparatus 1, so that a size of the printing apparatus 1 in the width direction can be reduced. Further, as shown by a surrounding line in FIG. 4, a part of the cutting unit 10 at the standby position SB is disposed to overlap the ink cartridges 8 in a plan view of the printing apparatus as viewed from front. Thus, by devising the arrangement position of the standby position SB, the printing apparatus 1 can be reduced in size.

Further, as shown in FIG. 3, by disposing the ink cartridges 8 on the front side of the standby position SB in the printing apparatus 1, the user can easily attach and detach the ink cartridges 8 to and from the printing apparatus 1. Further, by arranging the standby position SB on the rear side of the ink cartridges 8 in the printing apparatus 1, the size of the printing apparatus 1 in the width direction can be reduced.

Further, as shown in FIG. 1, by disposing the discharge tray 22 and the cartridge case 80 in which the ink cartridges 8 are mounted adjacent to each other in the width direction (the left-right direction of FIG. 1) of the printing apparatus 1, a size of the printing apparatus 1 in the front-rear direction can be reduced, and the printing apparatus 1 can be further reduced in size.

Further, as shown in FIG. 3, the standby position SB and the replacement position EX of the cutting unit 10 are arranged on the same side (the right side in FIG. 3) in the scanning direction (the left-right direction in FIG. 3) with respect to an arrangement position of the platen 34, and the standby position SB and the cap portion 70 are arranged adjacently in the front-rear direction of the printing apparatus 1. Accordingly, the size of the printing apparatus 1 in the width direction can be further reduced.

Further, as shown in FIG. 3, by arranging the replacement position EX of the cutting unit 10 on the outer side of the standby position SB in the scanning direction, the user can more easily replace the cutter unit 10C of the cutting unit 10 without being obstructed by parts disposed in the vicinity of a center of the printing apparatus 1 in the width direction.

Further, as shown in FIG. 10, the user can automatically move the cutting unit 10 to the replacement position EX by operating the configuration unit 123. Then, as shown in FIG. 5, the user can easily replace the cutter unit 10C with a tool or the like by accessing the opening portion 112 from the front of the printing apparatus 1 after pivoting the image scanning unit 12.

Further, as shown in FIG. 9, the length A of the sheet P in the first conveying direction D1 is calculated by using the detection results for the leading end and the trailing end of the sheet P from the registration sensor 120 (S5), the cutting position CL of the sheet P is set (S6), and then the sheet P can be cut by the cutting unit 10 at the set cutting position CL (S8). Thus, the sheet P can be cut by the cutting unit 10 accurately into a desired size.

Other Embodiments

In the embodiment described above, as shown in FIG. 3, the replacement position EX of the cutting unit 10 is arranged on the outer side of the standby position SB in the scanning direction, but the present disclosure is not limited thereto, and the replacement position EX of the cutting unit 10 may be the same position as the standby position SB. The standby position SB and the ink cartridges 8 may be shifted from each other in the upper-lower direction.

In the embodiment described above, the cartridge-type printing apparatus 1 in which the ink cartridges 8 are mounted in the cartridge case 80 is described, but the present disclosure is not limited thereto. For example, the printing apparatus may be a tank-type printing apparatus in which a bottle-type ink cartridge is directly connected to a connection port of the supply tube 82 to supply ink.

Further, in the embodiment described above, the number of ink cartridges 8 is four, but the number is not limited thereto, and may be, for example, six or eight. In a case of a monochrome printer, only one ink cartridge 8 corresponding to a black color may be sufficient.

In the embodiment described above, the registration sensor 120 detects passage of the leading end and the trailing end of the sheet P, but the present disclosure is not limited thereto. For example, a media sensor, which is a sensor for detecting whether the sheet P is present on the platen 34, may be provided on the image recording unit 3, and the passage of the leading end or the trailing end of the sheet P may be detected by the media sensor.

Further, in the embodiment described above, the sheet P is cut into two parts by the cutting unit 10, but the present disclosure is not limited thereto, and for example, the sheet P may be cut into three parts. Further, the cutting position X of the sheet P can be appropriately changed according to a size in the print data.

The flowchart shown in FIG. 9 is an example, and the present disclosure is not limited thereto. For example, after S4 of FIG. 9, the sheet P may be conveyed along the second conveying direction D2 in the second conveying path R2, and then cut by the cutting unit 10 in S8.

In the embodiments described above, the sheet P is conveyed by the feed roller 23 and the conveyance rollers 60, 62, 64, 66, and 68, which are roller members, but the present disclosure is not limited thereto. Alternatively, a belt member or a drum member may be used as the conveying unit.

The present disclosure is not limited to the embodiments described above, various modifications can be made within the scope of the claims, and embodiments obtained by appropriately combining technical means disclosed in different embodiments are also included in the technical scope of the present disclosure.

What is claimed is:

1. A printing apparatus comprising:

a liquid storage part configured to store a liquid;

a conveying unit configured to convey a recording medium along a conveying direction;

an image recording unit configured to record an image on the recording medium and includes a platen that supports the recording medium conveyed by the conveying unit;

a tube that connects the liquid storage part and the image recording unit and supplies the liquid from the liquid storage part to the image recording unit;

a cutting unit configured to cut the recording medium; and a controller, wherein the controller cuts the recording medium by moving the cutting unit to an outer side of the platen in a scanning direction intersecting the conveying direction, wherein, on the outer side of the platen in the scanning direction, a standby position for the cutting unit to stand by is arranged adjacent to the liquid storage part in a front-rear direction of the printing apparatus, and wherein at least a part of the cutting unit at the standby position is disposed such that a position thereof in a width direction of the printing apparatus overlaps the liquid storage part in a plan view of the printing apparatus as viewed from front.

2. The printing apparatus according to claim 1, wherein at least a part of the cutting unit at the standby position is disposed to overlap the liquid storage part in a plan view of the printing apparatus as viewed from front.

3. The printing apparatus according to claim 1, wherein the liquid storage part is disposed on a front side of the standby position in the printing apparatus.

4. The printing apparatus according to claim 3, further comprising:

a discharge tray to which the recording medium on which an image is recorded by the image recording unit is discharged, wherein the discharge tray is disposed adjacent to the liquid storage part in the width direction of the printing apparatus.

5. The printing apparatus according to claim 1, wherein a replacement position for replacing the cutting unit is provided on the outer side of the platen in the scanning direction, and wherein the standby position and the replacement position are arranged on the same side in the scanning direction.

6. The printing apparatus according to claim 5, wherein the replacement position is disposed an outer side of the standby position in the scanning direction.

7. The printing apparatus according to claim 5, wherein a configuration unit is provided on a front surface of the printing apparatus, and wherein the controller moves the cutting unit to the replacement position along the scanning direction when receiving an instruction for replacing the cutting unit from the configuration unit.

8. The printing apparatus according to claim 1, further comprising:

a recording head having a nozzle surface in which a nozzle for ejecting the liquid stored in the liquid storage part is formed; and a cap portion configured to cover the nozzle surface of the recording head in a standby state in which recording of an image on the recording medium is not being performed by the image recording unit, wherein the standby position is arranged adjacent to a position of the cap portion in a front-rear direction of the printing apparatus.

9. The printing apparatus according to claim 1, further comprising:

an image scanning unit pivotally provided above the image recording unit and configured to read the image recorded on the recording medium, wherein a replacement position for replacing the cutting unit is provided on the outer side of the platen in the scanning direction, and wherein the replacement position is arranged below the image scanning unit.

* * * * *